(12) United States Patent
Swindlehurst et al.

(10) Patent No.: US 6,206,136 B1
(45) Date of Patent: Mar. 27, 2001

(54) ACOUSTIC LINER AND METHOD OF MAKING AN ACOUSTIC LINER

(75) Inventors: Carl E. Swindlehurst, Baltimore, MD (US); Richard B. Plunkett, San Diego, CA (US); John F. Lennon, Baldwin, MD (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/364,906

(22) Filed: Jul. 23, 1999

(51) Int. Cl.$^7$ ........................................ F01N 1/12
(52) U.S. Cl. ............................ 181/290; 181/292
(58) Field of Search .................... 181/284, 288, 181/290, 292, 293, 213, 214; 428/116; 156/98

(56) References Cited

U.S. PATENT DOCUMENTS

| | | | |
|---|---|---|---|
| 3,640,357 | * | 2/1972 | Kitching et al. ............ 181/292 |
| 5,476,237 | * | 12/1995 | Clarke ........................ 244/110 B |
| 5,653,836 | * | 8/1997 | Mnich et al. ................ 428/116 |

* cited by examiner

*Primary Examiner*—Khanh Dang
(74) *Attorney, Agent, or Firm*—Andrew C. Hess; Nathan D. Herkamp

(57) ABSTRACT

The need for a woven screen or mesh is eliminated in composite acoustic liners by providing an absorptive acoustic liner in which the perforated facesheet has a coating of an erosion-resistant material applied thereto. The coating can be applied using a simple spraying process. The acoustic liner can be easily tuned by regulating the thickness of the coating.

30 Claims, 3 Drawing Sheets

ACOUSTIC LINER AND METHOD OF MAKING AN ACOUSTIC LINER

STATEMENT REGARDING FEDERALLY SPONSORED RESEARCH & DEVELOPMENT

The U.S. Government may have certain rights in this invention pursuant to contract number NAS3-98004 awarded by the National Aeronautics and Space Administration.

BACKGROUND OF THE INVENTION

The present invention relates generally to acoustic liners for suppressing noise in aircraft engines and more particularly to an erosion-resistant coating for such acoustic liners.

Aircraft engine noise can be a problem in high population areas or other noise controlled environments. In the case of turbofan engines, current design practice focuses on reducing noise through the use of absorptive acoustic liners that line various ducts of the engine, particularly the fan duct. Absorptive liners are known in various configurations, including the use of a honeycomb core sandwiched between an imperforate backing sheet and a perforate facesheet having a small amount of open surface area. This particular combination is sometimes referred to as a single degree of freedom absorptive acoustic liner.

Such liners are successful because they absorb the acoustic sound waves that impinge thereon and reduce the level of sound waves radiating from the duct terminations. Specifically, pressure waves cause air to pass into and out of the openings of the perforate facesheet, thereby generating a sufficient amount of friction, which is dissipated as heat energy. It should be understood that the key design parameter for this type of absorptive acoustic liner is the acoustic impedance, or the ratio of acoustic dynamic pressure to acoustic velocity, obtained at the surface of the liner. The acoustic impedance at any given frequency is obtained as a result of the particular configuration of the resistive and reactive elements incorporated into the mechanical design of the acoustic liner. Resistance relates to the liner's ability to dissipate noise energy as heat. Reactance relates to the liner's tendency to react noise energy back onto itself.

A modification to such single degree of freedom acoustic liners was subsequently developed to improve acoustic performance at all engine operating conditions. This modification involved the application of a woven fabric or mesh over the outer surfaces of the perforated facesheet. Typically, the acoustic mesh component is woven from fine stainless steel wires. Such liners having a mesh applied thereto are commonly known as linear single degree of freedom acoustic liners.

It is common in single degree of freedom absorptive acoustic liners to form the facesheets of lightweight composite materials to minimize the overall weight of the liner. However, many engine locations where the liners are used can present erosive environments. This is particularly true in the aft fan duct where the liner can be exposed to high-speed ingested sand particles and other debris. Composite components are highly susceptible to erosion in such environments. Because of this, the acoustic meshes that were added to improve acoustic performance were found to serve a secondary function of providing sufficient protection to perforated composite sheets. When further advances in single degree of freedom designs obviated the need for acoustic meshes to improve performance, the meshes were retained in composite liners in erosive environments because of their protective capability.

The mesh is ordinarily secured to the facesheet with a light film of epoxy adhesive. To insure that the adhesive film is uniformly thin, the use of elaborate robotic-controlled spray equipment is often used. Otherwise, excessive adhesive will wick into the mesh and result in blockages that adversely affect the performance of the liner. There are also epoxy spray misting processes that are used to acoustically tune the installed mesh. The fine epoxy droplets adhere to the mesh resulting in airflow perturbations that increase acoustic resistance of the liner.

In addition to adding complexity to the installation process, the mesh is a relatively expensive item that adds cost and weight to the liner. Furthermore, the mesh is susceptible to damage or loss during service and tends to become dirty and acoustically blocked over time. Since there is no effective cleaning technique for blocked acoustic mesh, performance recovery requires its removal and replacement in service.

Accordingly, there is a need for an absorptive acoustic liner for composite nacelle components that is relatively easy to install and tune and that eliminates the need for a protective woven screen or mesh.

SUMMARY OF THE INVENTION

The above-mentioned needs are met by the present invention which provides an acoustic liner comprising a support layer having a multiplicity of partitioned cavities and a perforated facesheet attached to one side of support layer, the perforated sheet having a coating of an erosion-resistant material applied thereto. The protective coating eliminates the need for an acoustic mesh. The acoustic liner can be easily tuned by regulating the thickness of the coating.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
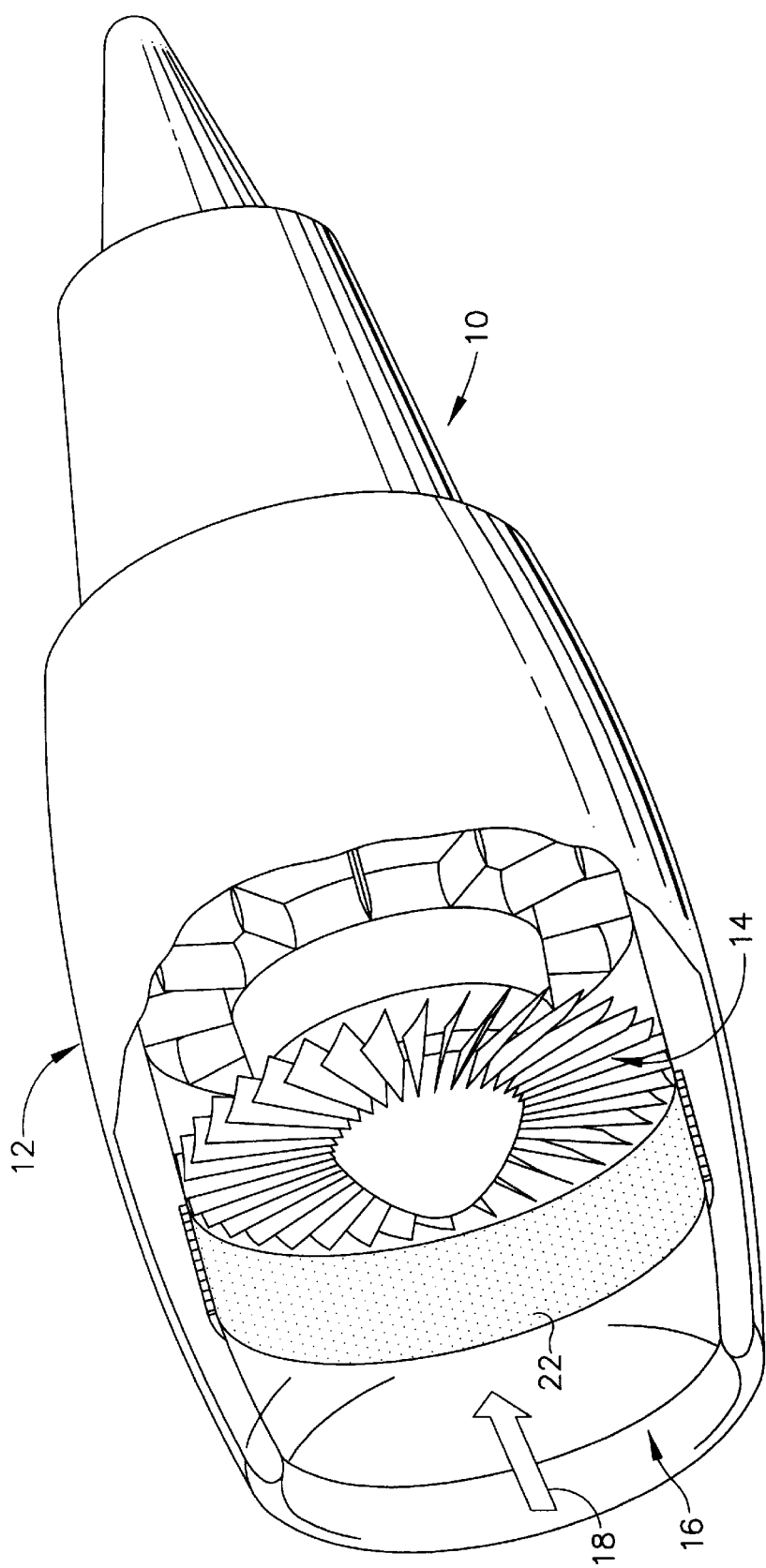
FIG. 1 is a perspective view of an exemplary turbofan aircraft gas turbine engine, wherein a portion has been broken away to show a nacelle having an acoustic liner of the present invention.

Referring to the drawings wherein identical reference numerals denote the same elements throughout the various views, FIG. 1 depicts an exemplary turbofan gas turbine engine 10 configured for powering an aircraft (not shown) in flight. The engine 10 typically will be attached to the wings, fuselage, or tail of the aircraft through appropriate mountings. In particular, the engine 10 includes a conventional nacelle 12 surrounding a conventional fan 14 which includes a plurality of circumferentially spaced fan blades powered by a power turbine (not shown) disposed downstream in the engine 10. The nacelle 12 defines a fan duct 16 that receives an ambient air flow 18 flowing downstream through the fan 14 along an axial centerline axis of the engine 10.

During operation of the fan 14, especially during takeoff of the aircraft when the fan blades reach transonic and supersonic velocities, noise is generated therefrom and propagated out of the fan duct 16 into the surrounding environment. In order to attenuate the noise generated within the nacelle 12, an absorptive acoustic liner 22 is disposed on the radially inner surface of the fan duct 16, upstream of the fan 14. The acoustic liner 22 is an annular member that preferably circles the entire inner surface of the fan duct 16.

It is noted that although the acoustic liner 22 is shown to be located in the forward portion of the fan duct 16, upstream of the fan 14, the present invention is not limited to this configuration. Instead, the acoustic liner 22 of the present invention can be disposed in many engine locations where noise suppression is appropriate, such as various ducts or casings throughout the engine 10. Use of the liner 22 is particularly beneficial in locations where erosion of composite components could be a problem. The aft fan duct is one such location. In the aft fan duct, there are multiple surfaces that are acoustically treated. One such surface is the radially inner surface of the aft duct, which is treated in similar manner to that of the forward duct, as described above. Other treated surfaces of the aft fan duct include an inner cowl that surrounds the hot engine and D-duct sidewalls that connect the inner and outer duct surfaces.

Figure 2:
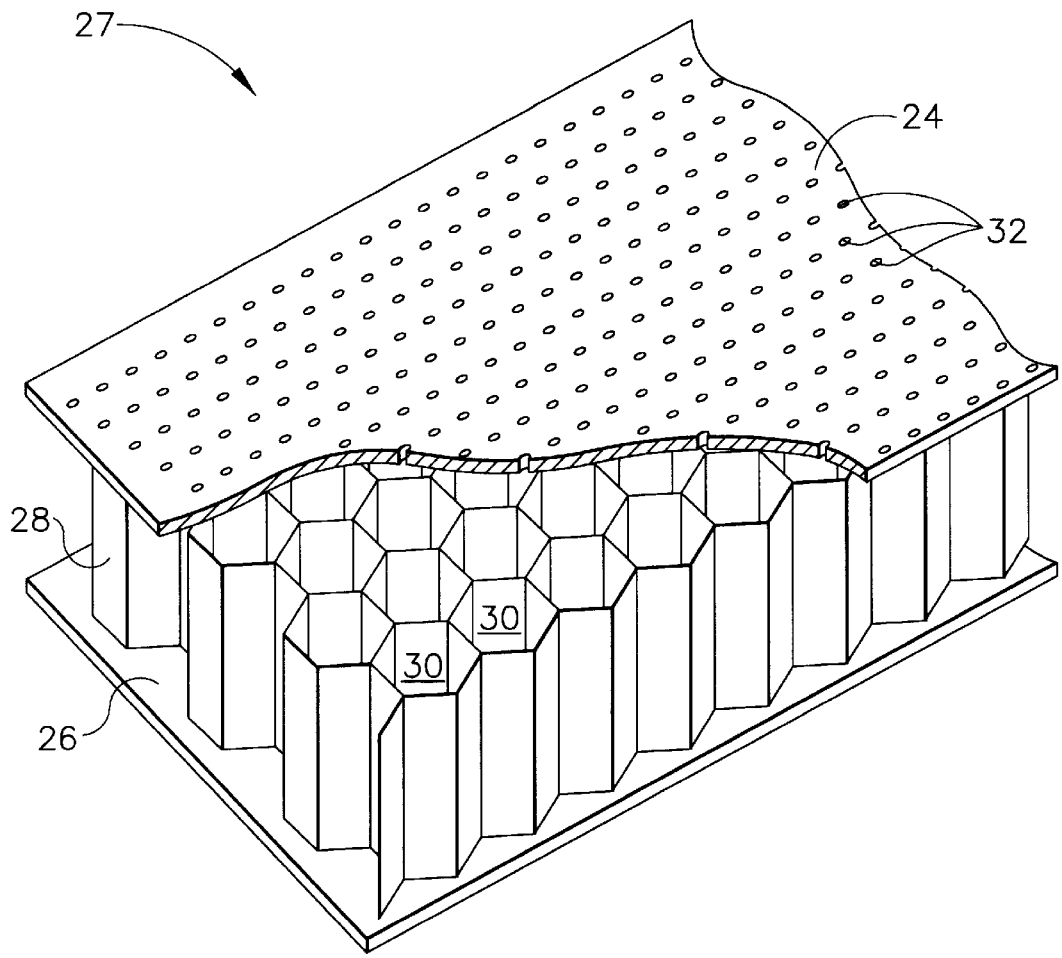
FIG. 2 is a perspective view, in partial cut-away, of the acoustic liner of the present invention.

Reference is now made to FIG. 2 wherein there is shown an enlarged fragmentary view of a portion of the acoustic liner 22. The liner 22 includes a perforated facesheet 24, an imperforate backing sheet 26, and a support layer 28 disposed between the facesheet 24 and the backing sheet 26. The support layer 28 is made of a cellular material such as a honeycomb structure that has a multiplicity of partitioned cavities 30. The facesheet 24 is attached to the radially inner side of the support layer 28 and the backing sheet 26 is attached to the radially outer side. The sheets 24, 26 can be attached to the support layer 28 in any known manner such as adhesive bonding or welding. The liner 22 is secured within the engine 10 by attaching the backing sheet 26 to the parent metal of the duct or casing in which the liner 22 is to be located.

The facesheet 24 is preferably, although not necessarily, made of a composite material. Suitable composites include carbon (graphite)-epoxy, fiberglass-epoxy, carbon (graphite)-bismaleimide and fiberglass-bismaleimide. Alternatively, the facesheet 24 could be made of a metal such as titanium, aluminum or steel alloys, although, as will be seen below, the present invention is most applicable to liners having composite facesheets. The facesheet 24 is provided with a plurality of perforations 32. The perforations 32 are sized and numbered such that the facesheet 24 has a predetermined open area ratio (i.e., the ratio of the open surface area defined by the perforations 32 to the total surface area of the facesheet 24).

As described above, the acoustic performance of the liner 22, that is, its ability to attenuate noise at a desired frequency or range of frequencies, is dependent on the liner's acoustic impedance. The acoustic impedance at a given frequency is a function of a number of parameters, including the depth of the cavities 30 and the open area ratio of the facesheet 24. Although at one time absorptive acoustic liners were designed to provide broad band attenuation (i.e., the attenuation of noise over a relatively wide frequency range, ideally within the audible range of the human ear), it is now believed that acoustic liners are effective when attenuating noise at a specific, problematic frequency and its higher harmonics. This is because the worst noise problem occurs in close proximity to the ground during takeoff and landing of the aircraft when the rotational velocity of the fan blades is typically greatest. Accordingly, engine noise is effectively controlled by attenuating the noise at critical takeoff and landing conditions. These frequencies, or the corresponding wavelengths, are used in determining the appropriate thickness of the support layer 28, and hence the depth of the cavities 30, as well as the appropriate open area ratio of the facesheet 24. That is, the depth of the cavities 30 and the open area ratio are set to values which best attenuate sound waves at these wavelengths.

Figure 3:
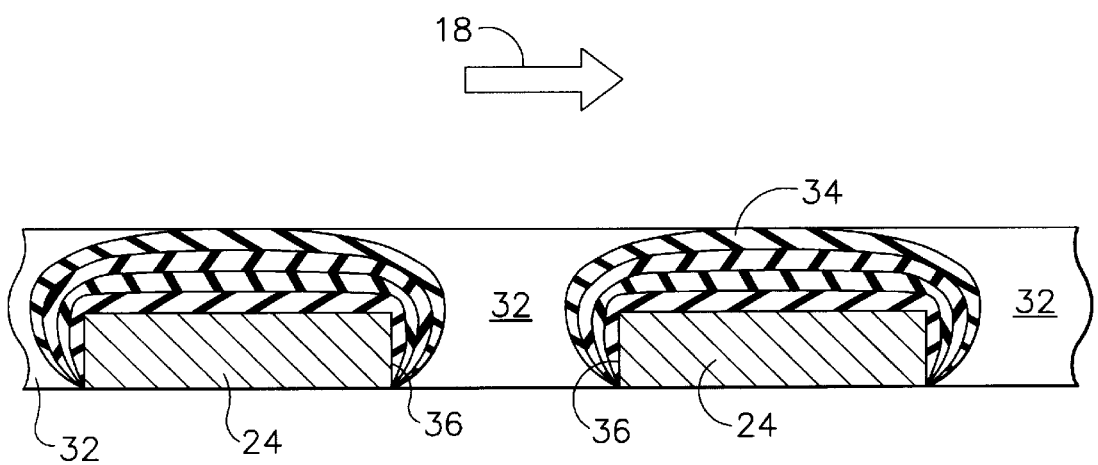
FIG. 3 is a sectional view of a coated facesheet from the acoustic liner of the present invention.

Referring to FIG. 3, it is seen that the facesheet 24 is provided with a protective coating 34 of an erosion-resistant material. The coating 34 functions to protect the facesheet 24, most particularly a facesheet that is made of a composite material, from the highly erosive environments that acoustic liners are often exposed to. The coating 34 may comprise any suitably erosion-resistant material. Silicone, fluorosilicone, fluoroelastomer and urethane have all been successfully demonstrated as suitable materials. Other commercially available coating materials are also possible.

The coating 34 can be applied with a simple spraying process using conventional spray equipment and is of a sufficient thickness so as to provide the desired degree of erosion protection to the facesheet 24. The required thickness of the coating 34 will depend on the particular application and the type of coating material used, but generally, thicknesses on the order of 0.010 inches will be used. As shown in FIG. 3, the coating is preferably applied in a plurality of layers. By changing the pigments in successive layers so as to make the layers visually distinct, wear of the coating 34 can be monitored visually. This permits appropriate repair or replacement procedures to be carried out at a convenient maintenance period.

Preferably, the coating 34 is applied to the radially inner surface of the facesheet 24 (i.e., the surface that will be exposed to the erosive environment) and to the walls 36 of the perforations 32. The perforation walls 36 are probably the most susceptible surface to erosion because of their orientation with respect to the flow 18 through the duct or casing. The build up of the coating 34 on the walls 36 will cause the cross-sectional area of the perforations 32 to be reduced. This reduction will mean that the open area ratio of the facesheet 24 will be reduced (with respect to a bare facesheet), thus affecting the acoustic performance of the liner 22. Accordingly, this effect should be taken into account during manufacture of the facesheet 24. That is, during manufacture of the facesheet 24, the perforations 32 should be formed large enough to compensate for the build up therein resulting from the coating 34.

The concept of coating the facesheet 24 with the protective coating 34 is generally independent of the configuration of the facesheet 24 or the process by which the facesheet 24 is manufactured, The coating 34 has been successfully applied to composite facesheets in which the perforations 32 were molded during the curing process and to composite facesheets in which the perforations 32 were created after curing by drilling or punching. The coating concept of the present invention is also applicable to a wide range of composite materials, including carbon (graphite)-epoxy, fiberglass-epoxy, carbon (graphite)-bismaleimide and fiberglass-bismaleimide.

By providing erosion protection to the composite facesheet 24, the coating 34 eliminates the need to use a woven screen or mesh as is common in conventional acoustic liners. The mesh is an expensive component that requires a complex installation process. Conversely, the coating 34 can be applied using conventional spray equipment and is consequently easier to install than the mesh. Thus, the coating concept of the present invention realizes significant cost savings over conventional linear single degree of freedom acoustic liners. Furthermore, the large maintenance costs associated with repairs and replacement of acoustic meshes are avoided. Incidental damage to the protective coating 34 can be easily repaired by a straightforward reapplication of the erosion-resistant material. In-service acoustic performance of the liner 22 is improved with respect to linear single degree of freedom acoustic liners. While the acoustic mesh tends to collect dirt that adversely affects acoustic performance, the coated facesheet 24 of the present invention is much less susceptible to such blockage because the perforations 34 are larger than the mesh openings.

Retrofit opportunities for existing linear single degree of freedom acoustic liners are possible with the coating concept of the present invention. Specifically, the existing acoustic mesh can simply be removed and replaced with a protective coating of erosion-resistant material. Although the coating will reduce the size of the perforations in the facesheet, acoustic performance may not be significantly affected because liners without meshes generally require smaller perforations than liners with meshes.

In addition to providing a protective function, the coating concept of the present invention presents an opportunity to tune the acoustic liner 22 by regulating the thickness of the coating 34. That is, once the minimum coating thickness required to provide erosion protection is obtained, application of additional coating material will increase the acoustic resistance (due to smaller perforation area) and thus alter the acoustic performance without impairing the anti-erosion performance. Thus, applying the coating 34 at a particular thickness will produce a desired acoustic performance of the liner 22. This tuning feature makes the coating concept of the present invention applicable to facesheets made of other materials, such as titanium, aluminum or steel alloys that are not as susceptible to erosion as composite materials. This is because, although not requiring erosion protection, such metallic facesheets could benefit from the acoustic tuning provided by the coating 34.

Figure 4:
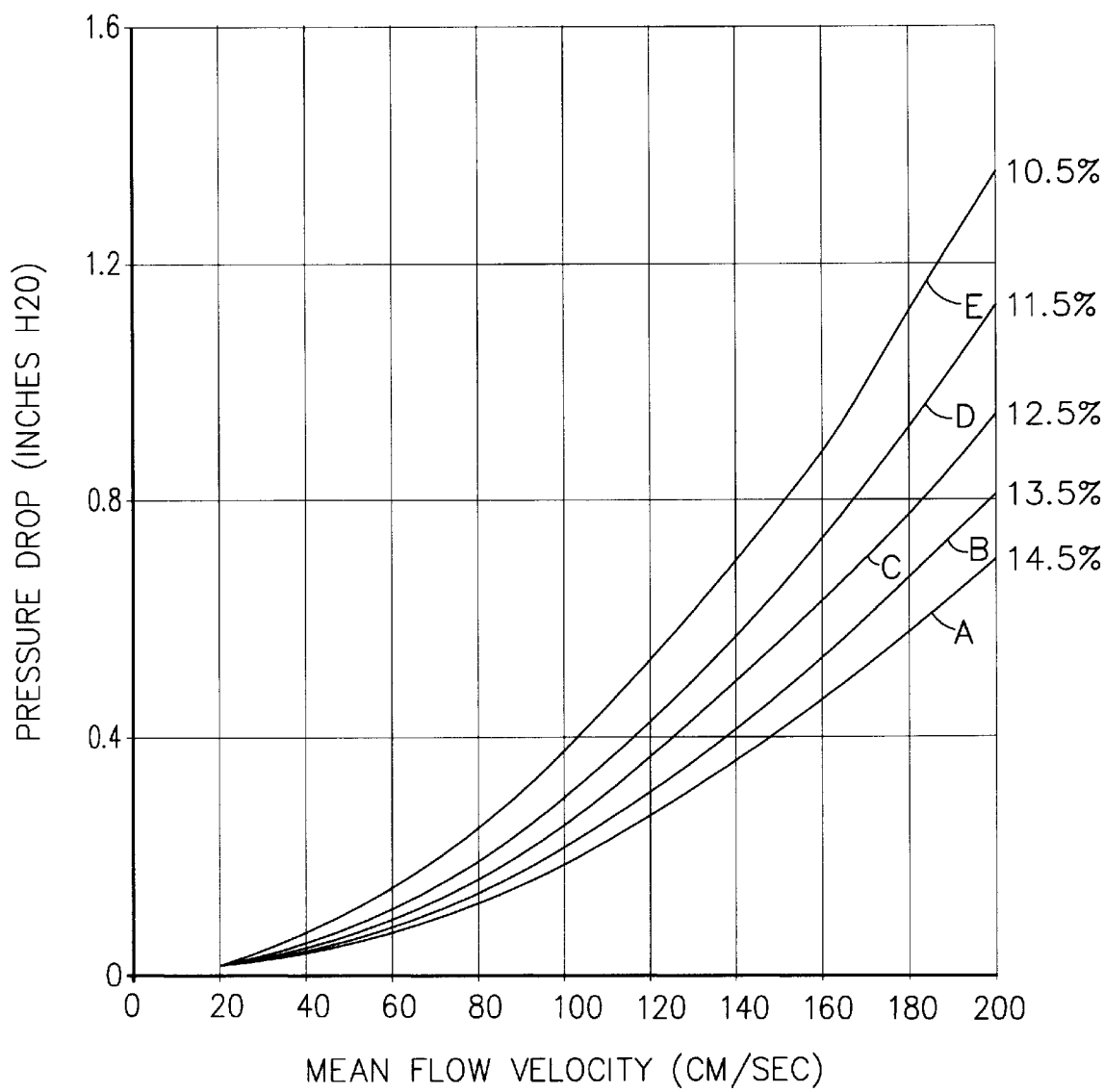
FIG. 4 is a graph showing flow resistance data for varying coating thicknesses.

The acoustic tuning capability is illustrated in FIG. 4 which is a graph showing flow resistance data for several coating thicknesses. Specifically, the graph plots the pressure drop (in inches $H_2O$) across the liner 22 against the mean flow velocity (in cm/sec) through the perforations 32. Curve A represents the result of measurements taken with no coating applied, curve B corresponds to a coating thickness of 5.25 mils, curve C corresponds to a coating thickness of 6.75 mils, curve corresponds to a coating thickness of 10 mils, and curve E corresponds to a coating thickness of 15 mils. The number next to each curve represents the corresponding equivalent open area ratio of the facesheet. The results of these measurements indicate how the flow resistance increases as the open area ratio decreases due to application of successively thicker coatings.

In one preferred manner of manufacturing the acoustic liner 22 of the present invention, the coating 34 is applied by spraying the erosion-resistant material onto the facesheet 24 with conventional spray equipment. The coating material is preferably applied in multiple passes in orthogonal directions. For example, the facesheet 24 is first sprayed in a vertical pass and then in a horizontal pass. Each pair of vertical and horizontal passes is known as a box coat. Optionally, the pigments used in the coating material are changed for each successive box coat. This procedure produces coating layers of different colors that permit wear of the coating 34 to be monitored visually. Preferably, the coating 34 is applied only to the surface of the facesheet 24 that will be exposed to the erosive environment and the walls 36 of the perforations 32.

The facesheet 24, backing sheet 26 and support layer 28 can be manufactured using any known process. As mentioned above, composite facesheets can be formed with the perforations 32 molded during the curing process or with the perforations 32 created after curing by drilling or punching. The facesheet 24 and backing sheet 26 are attached to the support layer 28 in any known manner such as adhesive bonding or welding. The coating 34 can be applied to the facesheet 24 either before or after the facesheet 24 is attached to the support layer 28. This will depend in part on the type of coating material used. For instance, if silicone is used for the coating 34, it is preferred to apply the coating 34 after bonding the facesheet 24 to the support layer 28. This is because if the silicone coating is applied prior to bonding, then it could affect the strength of the adhesive bond.

The foregoing has described an absorptive acoustic liner having a protective coating that eliminates the need for an acoustic mesh and provides a tuning capability. While specific embodiments of the present invention have been described, it will be apparent to those skilled in the art that various modifications thereto can be made without departing from the spirit and scope of the invention as defined in the appended claims.

What is claimed is:

1. An acoustic liner for use in attenuating noise, said liner comprising:

a support layer having a multiplicity of partitioned cavities;

a perforated sheet attached to one side of said support layer and having a plurality of perforations formed therein, each one of said perforations defining a wall; and a coating of an erosion-resistant material applied to one side of said perforated sheet and to said perforation walls.

2. The liner of claim 1 further comprising an imperforate sheet attached to another side of said support layer.

3. The liner of claim 1 wherein said erosion-resistant material is silicone.

4. The liner of claim 1 wherein said erosion-resistant material is fluoro-silicone.

5. The liner of claim 1 wherein said erosion-resistant material is fluoroelastomer.

6. The liner of claim 1 wherein said erosion-resistant material is urethane.

7. The liner of claim 1 wherein said perforated sheet comprises a composite material.

8. The liner of claim 1 wherein said coating comprises a plurality of visually distinct layers.

9. The liner of claim 1 wherein said coating is of sufficient thickness to provide erosion protection to said perforated sheet.

10. The liner of claim 1 wherein said coating is thicker than a minimum thickness required to provide erosion protection so as to provide a desired acoustic performance.

11. An acoustic liner for use in attenuating noise, said liner comprising:
   a support layer having a multiplicity of partitioned cavities;
   an imperforate sheet attached to one side of said support layer;
   a perforated sheet attached to another side of said support layer and having a plurality of perforations formed therein, each one of said perforations defining a wall; and
   a coating of an erosion-resistant material applied to an exposed surface and to said perforation walls.

12. The liner of claim 11 wherein said erosion-resistant material is silicone.

13. The liner of claim 11 wherein said erosion-resistant material is fluoro-silicone.

14. The liner of claim 11 wherein said erosion-resistant material is fluoroelastomer.

15. The liner of claim 11 wherein said erosion-resistant material is urethane.

16. The liner of claim 11 wherein said perforated sheet comprises a composite material.

17. The liner of claim 11 wherein said coating comprises a plurality of visually distinct layers.

18. The liner of claim 11 wherein said coating is of sufficient thickness to provide erosion protection to said perforated sheet.

19. The liner of claim 11 wherein said coating is thicker than a minimum thickness required to provide erosion protection so as to provide a desired acoustic performance.

20. A method of making an acoustic liner for use in attenuating noise, said method comprising the steps of:
   providing a perforated sheet having a plurality of perforations formed therein, each one of said perforations defining a wall;
   coating one side of said perforated sheet and said perforation walls with an erosion-resistant material; and
   attaching said perforated sheet to one side of a support layer.

21. The method of claim 20 further comprising the step of attaching an imperforate sheet attached to another side of said support layer.

22. The method of claim 20 wherein said step of coating comprises spraying said erosion-resistant material onto said one side of said perforated sheet and said perforation walls.

23. The method of claim 20 wherein said erosion-resistant material is applied in a plurality of visually distinct layers.

24. The method of claim 20 wherein said step of coating is performed prior to said step of attaching said perforated sheet to said support layer.

25. The method of claim 20 wherein said step of coating is performed after said step of attaching said perforated sheet to said support layer.

26. A method of treating an acoustic finer having a perforated sheet and a mesh disposed on said perforated sheet, said perforated sheet having a plurality of perforations and each one of said perforations defining a wall, said method comprising the steps of:
   removing said mesh; and
   coating one side of said perforated sheet and said perforation walls with an erosion-resistant material.

27. The method of claim 26 wherein said step of coating comprises spraying said erosion-resistant material onto said one side of said perforated sheet and said perforation walls.

28. The method of claim 26 wherein said erosion-resistant material is applied in a plurality of visually distinct layers.

29. The method of claim 20 wherein said erosion-resistant material is thicker than a minimum thickness required to provide erosion protection so as to provide a desired acoustic performance.

30. The method of claim 26 wherein said erosion-resistant material is thicker than a minimum thickness required to provide erosion protection so as to provide a desired acoustic performance.

* * * * *